3,812,012
METHOD OF DEGRADING NATURAL PLANT
MATERIAL WITH AN ENZYME PREPARATION
Lothar Buschmann, Hofheim, Taunus, Paul Prave, Neuenhain, Taunus, and Dieter Sukatsch, Frankfurt am Main, Germany, assignors to Farbwerke Hoechst Aktiengesellschaft vormals Meister Lucius & Bruning, Frankfurt am Main, Germany
No Drawing. Original application Nov. 5, 1971, Ser. No. 196,175, now abandoned. Divided and this application July 24, 1973, Ser. No. 382,220
Claims priority, application Germany, Nov. 7, 1970, P 20 54 948.8
Int. Cl. A61k 19/00
U.S. Cl. 195—33
1 Claim

ABSTRACT OF THE DISCLOSURE

A method degrading natural plant material with an enzyme preparation obtained by the cultivation of Bacillus polymyxa and and containing pectic acid trans-eliminase as the effective ingredient thereof.

---

This is a division of application Ser. No. 196,175, filed Nov. 5, 1971 and now abandoned.

The present invention relates to a plant degrading enzyme, a process for its manufacture and its use in digestive preparations.

For a long time enzymes have been added to a great number of digestive preparations in order to degrade vegetable foodstuff.

Cell walls of plants are substantially composed of cellulose and hemicelluloses. It is known to add to digestive preparations enzyme concentrates with increased and standardized cellulase and/or hemicellulase activity. For the biochemical standardization there are generally used as substrates carboxymethyl cellulose (a chemically substituted soluble cellulose) or extracts from reindeer-moss (lichenin).

Carboxymethyl cellulose, however, differs in its chemical and biochemical properties very much from native cellulose which is found in the cell walls of plants; lichenin, in general, is also not a component of the cell walls of higher plants. Thus enzymes which have proved to be efficient in the standardization test show only poor effects on natural comminuted plant material. Furthermore, these enzymes have their pH-optimum in the acid range. At neutral pH, the physiological range of the intestines, their activity is highly reduced.

It is also known to add pectin hydrolases to digestive preparations which contribute to the natural degradation of plants. Degradation tests using pectin hydrolases on genuine plant material under the physiological conditions of digestion have, however, been as unsatisfactory as the abovementioned degradation tests with the use of cellulases.

The action of pectinases is generally examined with soluble pectins. In contradistiction to them, the unsoluble pectin substances present in the cell walls of plants are chemically and physically cross-linked with the other poly-saccharide components and therefore differ from the isolated soluble pectins in their biochemical properties. For this reason, pectin hydrolases can be very active against soluble pectins used as substrate, whereas genuine plant material is degraded by them at a reduced speed only.

For the first time, Albersheim, Neukom and Deuel [cf. Helv. chim. Acta 43, 1422 (1960)] found in a commercial enzyme preparation used for the clarification of fruit juice, an enzyme which splits the glycosidically linked galacturonic acid units of pectin not according to the known hydrolytic mechanism but according to an eliminative mechanism. In this process, the glycosidical rests are split while forming a double bond. This enzyme has been given the name of pectin-trans-eliminase by the authors. Later on, an enzyme of similar action, the pectic acid-trans-eliminase, was found in culture filtrates of the Bacillus polymyxa [cf. Nagel and Anderson, Arch. Biochem, Biophys. 112, 322 (1965)]. The authors mentioned above have exclusively worked on the splitting of oligogalacturonic acids and soluble pectic acids. Since these substrates are synthetic hydrolysis products, whereas the pectin substances naturally occurring in the molecular network of the cell walls of plants are methyl esters, a degrading activity of the enzyme on genuine plant material could not be expected.

It was now found that enzymes obtained from culture filtrates of the Bacillus polymyxa degrade plant materials, especially coarsely comminuted vegetable paste, in excellent manner under the physiological conditions of the intestines. The activity of the enzymes is fully preserved even in the presence of high concentrations of pancreatic ferments. A detailed examination of the enzymes isolated from the Bacillus polymyxa shows that the plant degrading property is in the first line due to the presence of pectic acid-trans-eliminases (PATE). The high degradation of genuine plant material which was found was surprising and could not be expected from the state of the art.

For the manufacture of the enzyme, Bacillus polymyxa is cultivated under submerged aerobic conditions by advantageously using aqueous nutrient media which contain, as carbon sources starch, cane sugar, molasses or glucose and, as nitrogen sources, soy bean flour, corn-steep liquor, yeast extracts, peptones, nitrates or ammonium salts as well as organic and inorganic salts, especialy calcium carbonate.

On principle, good yields of the enzyme may also be obtained by an anaerobic cultivation of Bacillus polymyxa; from the technical point of view, however, aerobic cultivation can generally be carried out more easily.

Fermentation is carried out discontinuously (batch-process) while stirring and aerating, the pH being preferably maintained within the range of from 5.2 to 7.8, in general, over a period of from 2 to 4 days, depending on the size of the receptacles. After that period, the enzyme concentration substantially ceases to increase. The enzyme is isolated from the culture solution in good yields, i.e. of 30,000 units/ml. in total. To this effect, the enzyme is precipitated from the filtrate of the culture solution by means of solvents miscible with water, for example, acetone or isopropanol, subsequently dried and obtained as solid crude product. It has, then, an activity of from 1,500 to 3,000 units/mg.

Using nutrient media especially rich in nutrients the enzyme yield may be increased up to about 130,000 units/ml.; in these cases, the manufacture of an enzyme dry powder is more difficult because of the high portions of mucoids which largely inhibit the filtration especially under sterile conditions, the capability of being precipitated and dried and which produce hygroscopic powders.

Especially high yields are obtained from the strain of the *Bacillus polymyxa* K 890/3 (a culture of which has been deposited with the American Type Culture Collection, 12301 Parklawn Drive, Rockville, Maryland 20582, U.S.A. under Deposit No. ATCC 21551) isolated from a sample taken from the water of Lake Constance, or its variants, mutants and revertants. The strain K 890/3 is distinguished in comparison with the known strain of *Bacillus polymyxa* ATCC 842 by the following morphological and physiological properties:

disintegration of the total cell wall can be observed under the microscope. It is thus understandable that the elasticity of the particles decreases to a large extent. The considerable weight decrease of the cell walls after the action of the enzyme can be explained as being due to the fact that decomposition affects the whole cell wall and not only the medial lamella, the weight of which is negligible.

For the use of the enzyme of the invention as digestive preparation the disintegration of the whole cell wall is of fundamental importance as thus the natural digestive

TABLE 1

Organic source of nitrogen (peptone)

| Characteristics | B. polymyxa ATCC 21551 | B. polymyxa ATCC 842 | Characteristics | B. polymyxa ATCC 21551 | B. polymyxa ATCC 842 |
|---|---|---|---|---|---|
| Consumption of— | | | | | |
| Fructose | + G | + G | Haemoglobin splitting | − | − |
| Arabinose | + G | + G | Chitin splitting | − | − |
| Mannose | + G | + G | Cellulose splitting | − | − |
| Raffinose | + G | + G | Growth in NaCl solution 4% | + | + |
| Mannitol | + G | + G | Growth at 5% NaCl | − | − |
| Starch | + G | + G | Growth at +40° C | + | − |
| Glycerol | + G | + G | Growth at +45° C | − | − |
| Maltose | + G | + G | Glucose-$H_2O$ | pH 4.8–7.2 | 5.0–8.0 |
| Lactose | + G | + G | Voges-Proskauer reaction | + | + |
| Xylose | + G | + G | Methyl-red-reaction | − | − |
| Glycose | + G | + G | Indol-reaction | − | − |
| Sorbitol | + G | + G | Development of $H_2S$ | + | + |
| Galactose | + G | + G | Nitrate reduction | + | + |
| Salicin | + G | + G | Citrate as source of carbon | − | − |
| Insulin | + G | + G | Urea as source of nitrogen | − | − |
| Saccharose | + G | + G | Coagulation of milk agar | + | + |
| Rhamnose | ± G | + G | Reduction of methylene-blue | ± | ± |
| Dulcitol | ± G | + G | Vitamin needed | ± | + |

Inorganic nitrogen source ($NH_4^+$-salt)

| | | | | | |
|---|---|---|---|---|---|
| Consumption of— | | | | | |
| Glucose | + G | + G | Aerobic growth | + | + |
| Saccharose | + G | + G | Anerobic growth | ± G | + G |
| Glycerol | + G | + G | Antibiotic activity | + | ± |
| Arabinose | + G | + G | Pigment formation | − | − |
| Xylose | + G | + G | Yolk reaction | ± | − |
| Mannitol | + G | + G | Gram's stain | ± | ± |
| Lactose | + G | + G | Motility | ± | + |
| Rhamnose | + G | ± G | Formation of mucus | + | + |
| Sorbitol | + G | + G | Degradation of gelatine | + | + |
| Pectin | + G | + G | Cytochromoxydase | − | − |
| Size of spores | 0.7 x 0.8 μ | 0.6 x 1.0 μ | Protease activity | + | + |
| Size of rods | 2.5 x 5.0 μ | 2.0 x 7.0 μ | Pate | + | ± |
| Degradation of starch | + | + | Lipocatabolism | ± | ± |
| Degradation of urea | − | + | Splitting of $H_2O_2$ | + | + |
| Phenyl alanin-deaminase | − | − | Phosphatase | + | + |
| Oxydase | − | − | Lysindecarboxylase | − | + |

NOTE.—G=gas formation, +=positive or stated, −=negative or not stated, ±=positive under special conditions.

The extraordinary quantitative and qualitative action of the enzyme of the *Bacillus polymyxa* was found in a test arrangement which imitates to a large extent the special conditions of the intestinal digestion. Since vegetable food-stuff reaches the intestines generally after having been chewed finely, fresh as well as cooked plants have been used as homogenizates in the tests in vitro. In the intestines, the pH of the chyme is nearly neutral due to a physiological regulating mechanism. In the arrangement in vitro, strong buffer solutions added to the plant homogenates stabilize the pH at a value of 7.0.

After incubation of the homogenizates for several hours using very low concentrations of the enzyme obtained from the *Bacillus polymyxa* a heavy destruction of the plant particles can be observed. The proceeding disintegration of the cell walls is measured with regard to the weight of the dry residue of the plants as compared with the control samples which showed weight decreases of up to 60%. A considerable quantitative decrease in the elastic properties of the tissue particles can also be observed.

For comparison, a number of pectinases, cellulases and hemicellulases of other micro-organisms and of commonly used pectinolytic enzyme preparations have been examined. This examination showed that the enzyme of *Bacillus polymyxa* had a considerably increased effect as compared to the comparative preparations. The enzyme mixtures which have been described in literature attack, above all, the medial lamella of the cell walls; upon the action of the enzyme from *Bacillus polymyxa*, however, enzymes of the intestines have a facilitated access to the substances contained in the plant cell.

To elaborate and control the manufacturing conditions of the enzyme from *Bacillus polymyxa* a determination of PATE alone is advantageous. The routine test is carried out with pectic acid as a substrate. Due to the eliminative splitting mechanism a double bond is formed in conjugation to the carboxylic group and an increase of absorption at 235 mμ resulting therefrom is registered. The pH-optimum with regard to the action on the cell walls of plants is within the range of from 6 to 8. The stability of the enzyme in aqueous solution is very good at a pH of from 4.0 to 8.0. Against the action of intestine proteases such as trypsin and chymotrypsin the pectic acid transeliminase is extremely stable.

BIOCHEMICAL TEST TO PROVE PATE 0.1% of pectic acid and 0.001 molar $CaCl_2$ in a 0.1 molar buffer solution of tris-(hydroxymethyl)-aminomethane and HCl of a pH of 8.5 were used as substrate. As test mixture 2 ml. of substrate in a 10 mm. quartz bulb were mixed with 0.1 ml. of enzyme solution in a suitable dilution and incubated at 25° C. for 2 minutes. Registration was effected at 235 mμ in the spectrophotometer having a recorder joint to it. 1 enzyme unit was defined as to be the enzyme amount which causes, under the reaction conditions, an increase in extinction of 0.1 within 10 minutes. Depending on the strain and the cultivation conditions from 1 to $130.10^3$ units of PATE per ml. of culture filtrate have been found in the test reaction mixtures.

BIOCHEMICAL TEST TO PROVE THE MACERATING EFFECT

Turnip cabbage, i.e. Kohlrabi (or other plant material) was used as substrate which was homogenized by the addition of 0.25 molar imidazol buffer of a pH of 7.0 so that a viscous paste was obtained. The pH was adjusted at 7.0 by means of dilute sodium hydroxide solution. To prepare the test mixture 1 ml. of enzyme solution was added to 30 ml. of substrate, each enzyme sample having been incubated at 37° C. for 7 hours, in several dilutions in separate reaction mixtures. The cell wall residues which remained undissolved were centrifuged at about 2000 g. and successively washed twice with 50 ml. of water each time, once with 50 ml. of alcohol and twice with 50 ml. of acetone each time. After simple air drying the solution was heated at 120° C. for 4 hours and the weight of the dry residue was determined. In every test series 2 to 3 control values were determined. The weight decreases obtained under the action of the enzyme were measured in percentages with reference to the control samples.

The following Table II shows a comparison of the activities of different known pectinase, hemicellulase and cellulase preparations with enzyme crude powders prepared from different strains of Bacillus polymyxa. The test plant used was turnip cabbage (Kohlrabi), the enzyme concentrations were 3 mg./30 ml. each and 0.3 mg./30 ml. of homogenizate. Tolerance: ±3% as compared with the control samples.

TABLE II

| Enzyme preparations of— | Weight decrease of the plant material in percent | |
|---|---|---|
| | 3 mg. enzyme preparation | 0.3 mg enzyme preparation |
| Aspergillus niger | 7 | 4 |
| Aspergillus oryzae | | |
| Penicillium chrysogenum | 6 | 3 |
| Penicillium frequentans | 5 | 4 |
| Sclerotinia fructigena | 6 | 4 |
| Bacillus mesentericus | | |
| Diverse commercial preparations (pektinases, cellulases, hemicellulases) without indication of strain | <8 | <5 |
| B. polymyxa K 890/3 | 58 | 30 |
| B. polymyxa K 890/1 | 53 | 29 |
| B. polymyxa K 890/2 | 41 | 15 |
| B. polymyxa K 890/4 | 24 | 5 |

The figures of the above Table II show that the enzyme mixture of Bacillus polymyxa according to the invention has a substantially increased effect on the cell walls of vegetables at a pH of 7.0 as compared to the known enzyme preparations.

The enzyme action depends on the enzyme concentration used not in a linear but in a logarithmic way. An important consequence resulting therefrom for the use in practice is the fact that also very slight enzyme concentrations have significant degradation activities. A degrading action of the enzyme of the invention on plant materials can still be seen at a value of 0.003 mg./ml. of vegetable homogenizate, the tolerance of the test system taken into account, while this value is limited at 0.1 mg./ml. or above for all comparative preparations tested. This corresponds to a difference of about 2 orders of magnitude as compared to the preparations compared.

The following examples illustrate the invention. The parts and percentages are by weight, unless otherwise stated.

EXAMPLE 1

The Bacillus polymyxa FH–K 890/3 ATCC 21551 was inoculated on agar slant tubes having a nutrient medium of the following composition.

0.1% of yeast extract
0.1% of malt extract
1.0% of loess clay
0.1% of meat-extract
2.5% of casein peptone
0.01% of trypticase
0.5% of glucose
0.01% of soy bean oil
0.5% of corn steep liquor
1.0% of $CaCO_3$
1.0% of cane sugar
1.0% of soy bean flour
1.0% of starch
1.8% of agar pH 6.0–6.8

The inoculated tube was incubated at 28° C. for 3 days and maintained at room temperature for a further 5 days, until a dense cover of spores had developed. The spore material was floated from the slant tube by means of 10 ml. of sterilized distilled water or physiologic NaCl-solution. 5 ml. of the floated material were used for the inoculation of a 300 ml. Erlenmayer flask which contained 100 ml. of sterilized nutrient solution, pH 7, of the following composition:

2.0% of saccharose
0.4% of casein peptone
0.4% of meat extract
0.1% of yeast extract
0.1% of liver extract
ad. 1000 ml. of $H_2O$ The flask was shaken on a shaking apparatus at +30 C. for 24 hours at 200 r.p.m. Then each time 5 ml. of this preculture were introduced in a sterile state in 20 Erlenmeyer flasks which contained each 50 ml. of nutrient solution of the following composition:

0.5% of soy bean flour
0.75% of starch
0.5% of corn steep liquor
0.05% of dry slop
0.005% of trypticase
1.0% of casein peptone
1.0% of starch sugar
0.25% of NaCl
ad. 1000 ml. of water, pH 7.2

These flasks represented the main culture and were shaken at 28° C. at 200 r.p.m. for 2 to 3 days on a shaking apparatus. At the second and third day of cultivation the PATE content was examined. For this purpose a sample was sharply separated from the cells and the solid particles of the nutrient medium by centrifugation and the double bonds obtained at the splitting of the pectic acid were measured in the spectrophotometer, at 235 mμ with the supernatant portion. One enzyme unit corresponded to the enzyme amount which caused an increase of extinction of 0.1 within 10 minutes under the reaction conditions. The strain Bacillus polymyxa ATCC 21551 yielded, in this test, 1500–2000 units/ml. at a pH of 7.8 on an average after main cultivation for 3 days.

Example 2

The reaction mixture was prepared as described in Example 1, however 250 ml. of sterilized nutrient solution of the following composition were used in 1 1-Erlenmeyer flasks and inoculated with 25 ml. of a suspension of microorganism:

4.0% of glucose
2.0% of soy bean flour
0.2% of $(NH_4)_2SO_4$
0.75% of $CaCO_3$
ad. 1000 ml. of water pH 7.0

After 3 days of cultivation while shaking at 28° C. and 220 r.p.m. this test yielded 4500 units/ml. at a final pH-value of 7.8 on an average.

Example 3

The reaction mixture was prepared as described in Example 1, however, as main culture a fermentation vessel of 30 l. total volume was used which was fed with 10 l. of a sterilized nutrient solution of the following composition:

4.0% of saccharose
1.0% of soy bean flour
0.5% of ammonium sulphate
1.0% of CaCO$_3$
1.0% of corn steep liquor
ad. 1000 ml. of water pH 7.0

The sterilization period for this medium was 1 hour at 121° C. and 1 atm. The sugar was sterilized separately and was introduced into the fermentation vessel in sterile state after cooling. After sterilization a pH of from 6.7 to 7.0 shall be obtained and, if necessary, adjusted at this value by means of sterilized 2 N NaOH.

This main culture was inoculated with 500 ml. of a preculture as prepared and described in Example 1.

Fermentation was carried out at 28° C. for 50–70 hours. The mixture was aerated with 0.85 l. of air per minute and per l. of culture solution while stirring at about 200 r.p.m.

The course of fermentation was examined by taking a sample. The activity of PATE was increased at 30,000 units/ml. on an average within 48 hours. The culture solution was centrifuged and acetone was added to it in a ratio of 1:1.6. The precipitated product was centrifuged and dried. A fair, dry powder having an activity of about 3000 units/mg. was obtained.

Example 4

To obtain the enzyme in a continuous process a device was used which was based on the principle of the simple homogeneous open system. The fermentation vessel was provided with nozzles for the introduction of substrate and the discharge of culture solution, for the inlet and outlet of air, for the addition of base and acid, for the addition of an anti-foaming agent as well as nozzles for a pH electrode, a thermometer probe for the taking of a sample and for inoculation. The stirring speed was 240 r.p.m. The temperature was 28° C., the working volume was 1.5 l. Aeration was effected with 0.5 l. of air per minute and per l. of culture solution. The culture solution pumped off was introduced in cooled 500 ml. suction bottles.

The fermentation vessel and a storage vessel of a 10 l. volume were fed with a nutrient solution of the following composition:

3.0% of soluble starch
1.0% of meat peptone
1.0% of CaCO$_3$
0.5% of soy bean flour
0.5% of corn steep liquor
0.5% of (NH$_4$)$_2$SO$_4$
0.01% of D 3600 of polypropylene glycol
ad. 1000 ml. of water pH 7.4

Both vessels were sterilized at 120° C. at 1 atm. for 1 hour. Then the fermentation vessel was linked to the storage vessel by means of a tube and the same measures were taken for the receiving vessel.

After cooling and at a constant temperature of 28° C. the solution was inoculated with 150 ml. of a pre-culture prepared as described in Example 1. After 24 hours of cultivation the culture was brought to work continuously with constant flowing balance by the insertion of a pump. The flowing rate was adjusted such that the vessel contents were completely exchanged every 36 hours (D=0.0296)

The samples were tested every 24 hours to prove the activity of PATE; the results are summarized in Table III:

TABLE III

| Hours | Units | pH |
|---|---|---|
| 20 | 2,800 | 6.8 |
| 24 | 3,900 | 6.4 |
| 48 | 9,000 | 6.65 |
| 72 | 17,000 | 6.5 |
| 96 | 16,200 | 6.5 |
| 120 | 18,000 | 6.65 |
| 144 | 18,000 | 6.7 |
| 168 | 17,400 | 6.6 |
| 192 | 16,700 | 6.5 |
| 216 | 17,900 | 6.55 |
| 240 | 16,300 | 6.3 |

After a cultivation period of 240 hours the dissolving process of the culture was discontinued and the collected culture solution was worked on. The average activity was 15,000 units/ml.

PREPARATION OF A CRUDE SUBSTANCE

The technical isolation of the enzyme preparations was carried out according to conventional methods. Organic solvents, such as methanol, ethanol, isopropanol, acetone proved to be the best precipitation agents. The activity yields ranged within 65–90%. About 5–15 g. of fair, non-hygroscopic, water-soluble powders per liter of culture filtrate were obtained.

Example 30 l. of culture solution having 28,000 units/ml. (PATE) were freed from the largest amount of insoluble substances by centrifugation. After filtration in sterile state the 26.2 l. obtained were adjusted at a pH of a 6.5 and cooled at 5° C. By the addition of 50 l. of acetone (22° C.) a precipitate flocculated which was isolated, washed twice with acetone and dried at room temperature. Yield: 77%; 308 g. of 2100 units/mg. of PATE.

PURIFICATION BY AMMONIUM SULPHATE

Example 10 g. of the preparation mentioned were dissolved in 500 ml. of water. After saturation with ammonium sulphate the pH was adjusted at 4.5. After 1 hour the precipitate was centrifuged and introduced into 50 ml. of water. After dialysis against water for about 15 hours and subsequent freeze drying a fair, water-soluble powder was obtained. Yield: 57%; 630 ml. of 1908 units/mg. of PATE.

PURIFICATION CONTINUED

By means of known column-chromatographic methods (for example, Sephadex, ion exchanger and hydroxylapatite) the preparation obtained by saturation with ammonium sulphate could again be purified up to 14 times the prior value so that a total purification up to about 125 times the prior value could be obtained.

We claim:

1. The method of degrading natural plant material which comprises combining, at a substantially neutral pH, comminuted natural plant material and at least 0.003 milligrams, per milliliter of plant material, of an enzyme preparation obtained by the cultivation of *Bacillus polymyxa* and containing pectic acid trans-eliminase as the effective ingredient thereof.

References Cited

Nagel et al.: Archives of Biochemistry and Biophysics, vol. 112, pp. 322–330 (1965).

LIONEL M. SHAPIRO, Primary Examiner

U.S. Cl. X.R.

195—65; 424—94